(12) United States Patent
Langer et al.

(10) Patent No.: US 7,857,520 B2
(45) Date of Patent: Dec. 28, 2010

(54) COLLAR HAVING END-SIDE TEETH FOR A DRIVABLE WHEEL HUB

(75) Inventors: Roland Langer, Schwanfeld (DE); Ernst Masur, Untereuerheim (DE); Ralf Heiss, Schweinfurt (DE); Benno Fueller, Karlstadt (DE); Peter Niebling, Bad Kissingen (DE)

(73) Assignee: Schaeffler KG, Herzogenaurach (DE)

( * ) Notice: Subject to any disclaimer, the term of this patent is extended or adjusted under 35 U.S.C. 154(b) by 558 days.

(21) Appl. No.: 11/910,803

(22) PCT Filed: Mar. 9, 2006

(86) PCT No.: PCT/DE2006/000411
§ 371 (c)(1),
(2), (4) Date: Oct. 5, 2007

(87) PCT Pub. No.: WO2006/105748
PCT Pub. Date: Oct. 12, 2006

(65) Prior Publication Data
US 2008/0148893 A1    Jun. 26, 2008

(30) Foreign Application Priority Data
Apr. 8, 2005    (DE) ....................... 10 2005 016 427

(51) Int. Cl.
*F16C 13/00*    (2006.01)
*F16C 35/00*    (2006.01)
*F16H 55/10*    (2006.01)

(52) U.S. Cl. ..................... 384/544; 384/589; 74/434
(58) Field of Classification Search ............... 384/489, 384/537, 542, 544, 589; 74/434
See application file for complete search history.

(56) References Cited

U.S. PATENT DOCUMENTS

| 4,460,058 | A | * | 7/1984 | Welschof et al. ............ 180/258 |
| 4,893,960 | A | * | 1/1990 | Beier et al. ................... 403/24 |
| 5,226,738 | A |   | 7/1993 | Valette et al. |
| 6,012,986 | A | * | 1/2000 | Guimbretiere ............. 384/544 |
| 6,146,022 | A | * | 11/2000 | Sahashi et al. ............. 384/544 |
| 6,702,472 | B2 | * | 3/2004 | Sera et al. .................... 384/489 |
| 2002/0051597 | A1 |   | 5/2002 | Sera et al. |
| 2004/0120622 | A1 | * | 6/2004 | Tajima et al. ............... 384/544 |

FOREIGN PATENT DOCUMENTS

| DE | 31 16 720 A |   | 10/1982 |
| DE | 36 04 630 A |   | 8/1987 |
| DE | 3618130 A | * | 12/1987 |
| DE | 36 36 243 A |   | 5/1988 |
| DE | 196 37 940 A |   | 3/1997 |
| DE | 103 05 086 A |   | 8/2003 |
| GB | 2 122 724 A |   | 1/1984 |
| JP | 09166613 A | * | 6/1997 |

* cited by examiner

Primary Examiner—Marcus Charles
(74) Attorney, Agent, or Firm—Lucas & Mercanti, LLP

(57) ABSTRACT

A collar, made from plastically deformed material, of a hub. The collar holds at least one inner ring of a wheel bearing unit on the hub in an axially fixed manner. Also, end-side teeth, are formed in the collar for engaging in a mating toothing.

5 Claims, 5 Drawing Sheets

COLLAR HAVING END-SIDE TEETH FOR A DRIVABLE WHEEL HUB

FIELD OF THE INVENTION

The invention relates to a collar made from cold plastically shaped material of a hub, with which at least one inner ring of a wheel bearing unit is secured axially in a fixed manner on the hub and in which teeth for engagement in a mating toothing are formed at the end.

BACKGROUND OF THE INVENTION

DE 36 36 243 A1 is concerned with such a collar. The wheel bearing unit, generally an angular ball bearing arrangement or angular roller arrangement, is held free of play in a prestressed fashion by means of the collar. The finished collar 3 according to FIG. 1 is, as illustrated in FIG. 2a and FIG. 3, shaped from a hollow end piece 2 which is formed in one piece with a hub 1. When the collar 3 is formed, the material of the end piece 2 is turned-over plastically over the edge 4 of the inner ring 5 radially toward the outside. If the collar 3, as also illustrated in FIG. 2b, has an end toothing 6 with teeth 7 for engagement in a mating toothing (not illustrated in more detail), the teeth 7 are either also formed when the end piece 2 is placed around to form the collar 3 or the teeth 7 are formed in the finished collar 3 with a separate method step. The mating toothing is formed, for example, on a bell of a cardan shaft.

The collar 3 is shaped with a tool from the end piece 2. For this purpose, the end piece 2 which is initially essentially hollow-cylindrical, as illustrated in FIG. 3, is widened in a radial funnel shape and is shaped in the end position according to FIG. 2b to form the collar 3. The formation of the teeth 7 is problematic. The material of the part 8 of the end piece 2 tapers during the widening and turning-over process and flows radially outward. The respective tooth 7 is not fully formed toward the outside owing to the uncontrollable flowing away of the material, and the loadbearing component, which is determined in particular by the dimension B, is small. B is a line segment between the points S and T. The component C and A−(B+C) which is not filled in here is small measured in terms of the overall proportion of the tooth 7 over the length A.

Also, a portion of the material under certain circumstances moves toward the inside in an uncontrolled way so that an annular gap 31 is formed between the inner ring 5 and the hub 1 and has a disadvantageous effect on the fixed seat of the inner ring 5.

Specialists in the field have attempted to prevent this problem by means of a tool, as presented in DE 36 36 243 A1 which prevents the collar from flowing away radially on the outside. However, the process is generally difficult to implement with the necessary quality owing to tolerances in the dimensions of the blank such as the wall thickness and diameter of the end piece.

During the mounting of the drive element in the wheel hub arrangement, the drive element and the wheel hub center themselves relative to the rotational axis owing to the geometry of the toothing with respect to one another. A high degree of true running on the connection in the driving mode is thus secured. The mounting of the articulated part with respect to the hub is easy owing to the self-centering but it requires a very high axial prestressing force.

The edges of all the teeth of the end toothing engage with both edges of all the teeth of the mating toothing. The toothings are braced axially by means of one or more screw elements. Torques are transmitted to the wheel hub by the frictional engagement/positive engagement generated by surface pressure.

The connection of the articulated part to a wheel hub is advantageous in particular if high torques are to be transmitted from the drive to the wheel or, under certain circumstances, also in the reversed torque flow. The possibilities in terms of installation space and thus in terms of the rigidity of the pairs of inner toothings and outer toothings which are generally used are often already exploited to the full so that the end toothing is, compared to the latter, a reliable alternative which provides a saving in terms of installation space. The rigid configuration for transmitting high torques to the wheel can have a disadvantageous effect if, in the case of overloading, a fracture in the wheel hub leads to loss of the vehicle wheel in the most unfavorable case.

SUMMARY OF THE INVENTION

The object of the invention is therefore to provide a collar with whose design the previously mentioned disadvantages are avoided.

The collar is formed from plastically shaped material of the end piece of the hub. The material of the hollow end piece is preferably shaped cold by what is referred to as rolling riveting, a process of widening, bending and stamping, radially outward over the radially inner and axially outer edge of the inner ring. The end piece which is formed in one piece with the hub is, according to the invention, not essentially hollow-cylindrical but rather has an accumulation of material. The accumulation of material is formed at the part of the end piece which protrudes axially beyond the inner edge of the inner ring. Owing to the rotational symmetry of the end piece, the accumulation of material which runs around the rotational axis is generally a bead-shaped thickened portion which is continuous or interrupted in the circumferential direction.

The thickened portion is designed in any desired way and can protrude in both radial directions, that is to say radially outward away from the rotational axis and/or toward the rotational axis. The thickened portion preferably protrudes out of the end piece radially inward in the direction of the rotational axis of the hub before the collar is formed.

One embodiment of the invention provides for the thickened portion to be formed on a free, axial end of the end piece which projects from the hub.

As a result of the accumulation of material on the end piece, enough material is available to fill in the cavities for the teeth in the mold when the toothing is molded. The contour of the tooth is significantly better filled in and the loadbearing part is thus significantly increased. Special measures for restricting the radial flow of material are unnecessary.

The configuration of the individual tooth can be influenced and optimized by the shape and cross section of the thickened portion. There is thus provision for the outer contour of the thickened portion to drop away toward the end side of the end piece in the direction of the rotational axis.

The contour of the teeth is represented partially as a line segment in respective sections through the collar which extend through the tooth head along the rotational axis, with the line segment delineating the respective tooth head at the end. The line segment describes the straight profile of the tooth head contour in the longitudinal section along the rotational axis.

The optimum size of the line segment is provided with configurations of the invention. The shortest radial distance between the end points of the line segment is at least of precisely the same size, when viewed in an axial projection of the line segment, as half of the largest of this length of the respective tooth in the radial direction when viewed in an axial projection of the length of the tooth. Such a minimum amount ensures that each individual loadbearing tooth is filled in the axial direction and in the circumferential direction. The contour of the individual loadbearing tooth is initially described by a run-in contour in a longitudinal section along the rotational axis of the hub, with the run-in contour extending radially from the tooth base outward to the line segment rising over the rotational axis. The run-in contour is curved with any desired degree of concavity or convexity or is a chamfer.

The run-in contour merges with the line segment at the radially inner end point of the end points. The line segment merges at the radially outer end point of the line segment with a run-out contour toward the tooth base, with the run-out contour extending from the end point rising progressively or degressively or linearly or in any other desired way over the rotational axis.

The run-in contour and the run-out contour each end at the tooth base side at a sectional point at which the tooth merges with the hub. The sectional point is the root of the tooth at which the contour of the individual tooth merges with the solid base of the collar at the apex of the gap with the respective tooth.

The distance between the radially outer end point at the end of the line segment and the radially outer sectional point of the sectional points is at maximum as large, in the axial projection, as a third of the maximum length of the respective tooth in the radial direction when considered in an axial projection. The length of the respective tooth is described by the distance between the sectional points.

The teeth are of wedge-shaped design such that the geometric lines of the end toothing meet centrally at a common point on the rotational axis. The geometric lines are the body edges of the tooth excluding any edge radii, chamfers, rounded portions etc.

A further embodiment of the invention provides for the edges of the teeth of the end toothing which are provided for engagement to be each inclined at an edge angle greater than 20° and less than 30°. The edge angle is half the tooth angle in the case of a symmetrically formed toothing. The edges are inclined with the edge angle with respect to a virtual pitch plane E which starts from the rotational axis.

Limits are placed on the dimensions and changes in the dimensions of end toothings on wheel bearings for reasons of installation space. The diameter of the reference circle (median circumference of the end toothing about the rotational axis) of the toothing is accordingly generally prescribed within very tight limits. Accordingly, the behavior of the toothing, for example with respect to loads from the drive torques, can hardly be influenced, or cannot be influenced, by changes to the reference circle of the toothing. With the invention, the geometry of the individual teeth of the toothing is influenced by means of the edge angle in such a way that an optimum number of teeth on a predefined circumference can be specified in terms of assembly and in terms of the loads from torques. The edge angle of the effective edges which are in play-free engagement with the mating toothing is preferably 22.5°. As a result of this configuration, the prestressing forces during mounting are kept low owing to the relatively small axial force components in the toothing. The cross section of each individual tooth in the tooth root is configured in such a way that the end toothing transmits high torques in the rated operation but yields at a prescribed fracture torque.

BRIEF DESCRIPTION OF THE DRAWINGS

The present invention will be further understood and appreciated by reading the following description in conjunction with the accompanying drawings, in which.

DETAILED DESCRIPTION OF THE INVENTION

Figure 1:
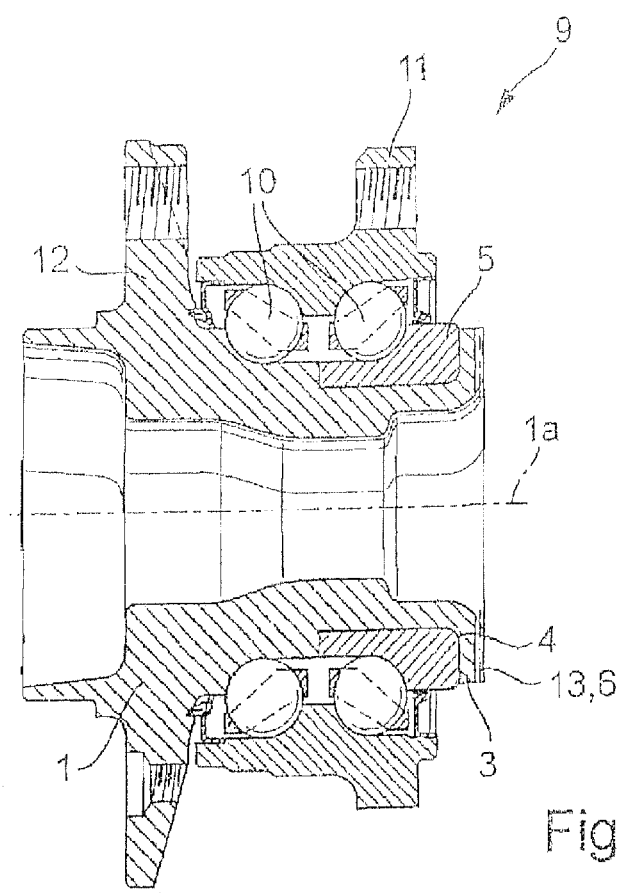
FIG. 1 shows a cross-sectional view of a known wheel bearing arrangement.
Figure 2A:
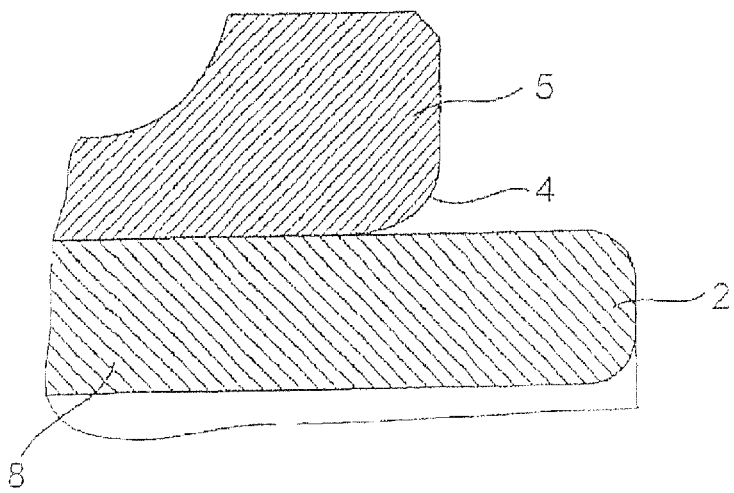
FIG. 2a shows a detail of a hollow end piece and inner ring of the known wheel bearing arrangement.
Figure 2B:
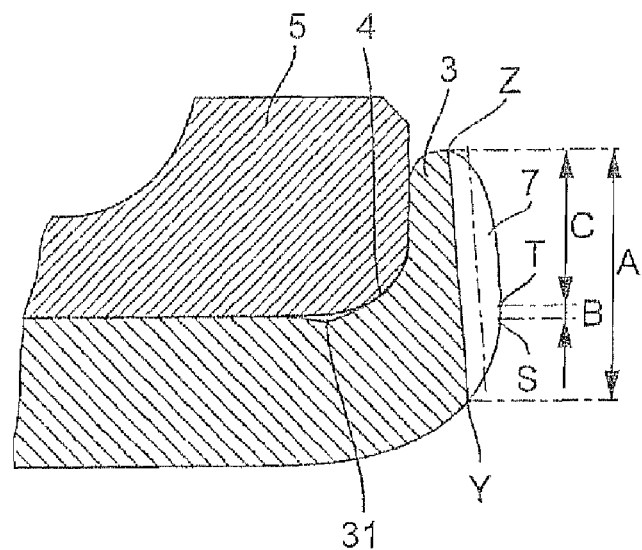
FIG. 2b shows a detail of a collar and inner ring of the known wheel bearing arrangement.
Figure 3:
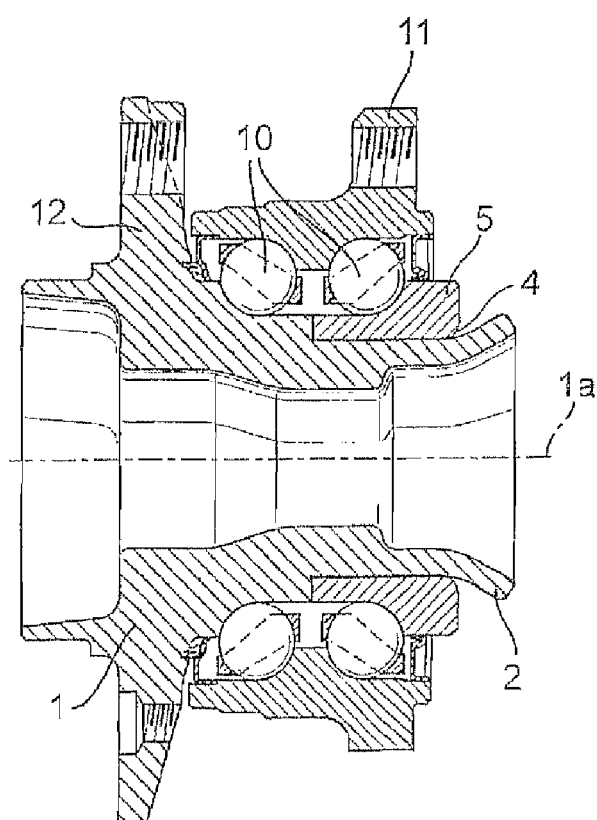
FIG. 3 shows a cross-sectional view of a known wheel bearing arrangement.
Figure 4:
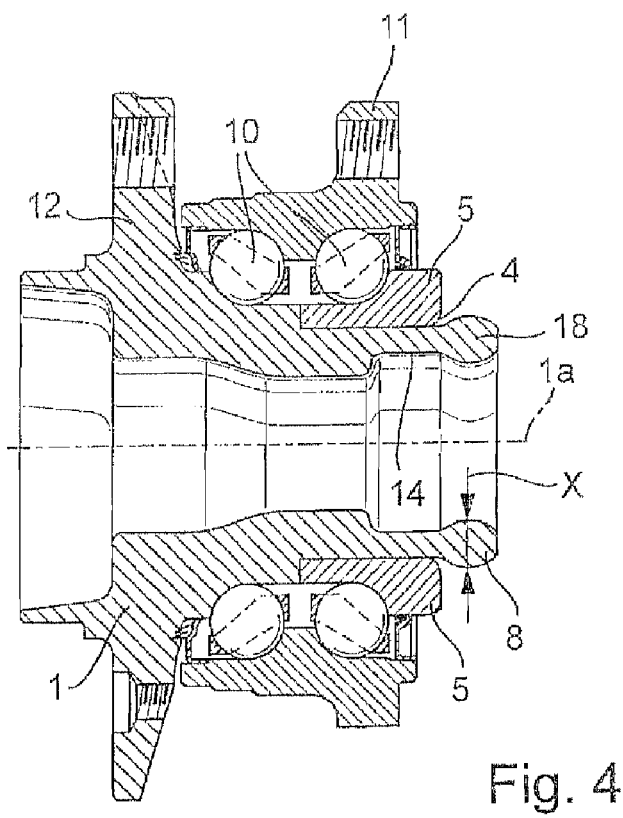
FIG. 4 shows a cross-sectional view of the inventive wheel bearing arrangement.
Figure 5:
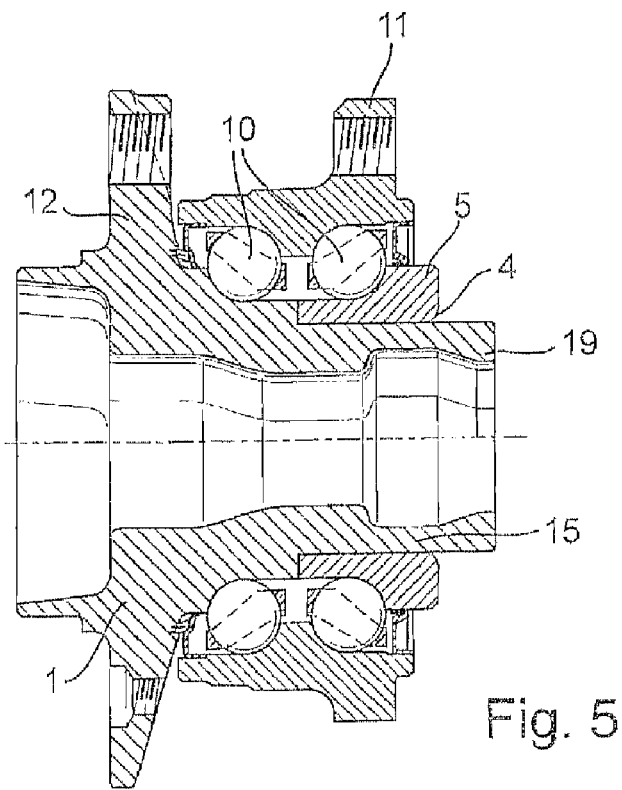
FIG. 5 shows a cross-sectional view of an alternative inventive wheel bearing arrangement.

FIGS. 1 to 6 show longitudinal sections or details of longitudinal sections along the rotational axis 1a of a wheel bearing arrangement 9 in various modifications of exemplary embodiments of the invention. FIGS. 1, 3, 5 show a wheel bearing arrangement 9 with a hub 1, two rows of rolling bodies 10 and a vehicle flange 11. The hub 1 has a flange 12 for attaching a vehicle wheel (not illustrated) and is mounted by means of the rolling bodies 10 so as to be rotatable about the rotational axis 1a with respect to the vehicle flange 11 which is fixed to the vehicle. An inner ring 5 sits on the hub 1 and has a row of the rolling bodies 10 running on it. In the illustrations according to FIGS. 4 and 5, the end piece 14, 15 or 17 which is connected in one piece to the hub 1 is in the initial position before the rolling riveting. The inner ring 5 is, as illustrated in an enlarged detail according to FIG. 6b, held axially on the hub 1 by means of a collar 16 which has been made to protrude from the end pieces 14, 15 or 17. For this purpose, the hollow end piece 14, 15 or 17 is shaped radially outward over an edge 4 of the inner ring 5. Furthermore, the angular ball bearing arrangement is prestressed by means of the collar 16. An end toothing 13 is formed in the collar 16.

The hollow end pieces 14, 15 or 17 point in the axial direction in the initial state before the collar 16 is formed, and in the process they project axially beyond the edge 4 which is rounded with a radius R. The end pieces 14, 15 or 17 have an accumulation of the material in the form of a radial thickened portion 18, 19 or 20 at least at the part 8 at which they protrude axially beyond the edge 4.

The rotationally symmetrical thickened portion 18 (illustrated in FIG. 4) on the end piece 14 has the largest radial dimension X in the center and protrudes radially in the direction of the rotational axis 1a and radially outward from the end piece 14. During the axial shaping of the collar 16 and of the end toothing 13, the material is distributed in both radial directions.

The thickened portion 19 which is illustrated in FIG. 5 protrudes radially in the direction of the rotational axis 1a and is thickest at the free end of the end piece 15 which points in the axial direction. During the shaping of the end toothing 13, such an accumulation of material is effective in particular in the region C (FIG. 6) so that less material flows outward and is thus available to fill in the cavities in the teeth 7 in the region B.

Figure 6A:
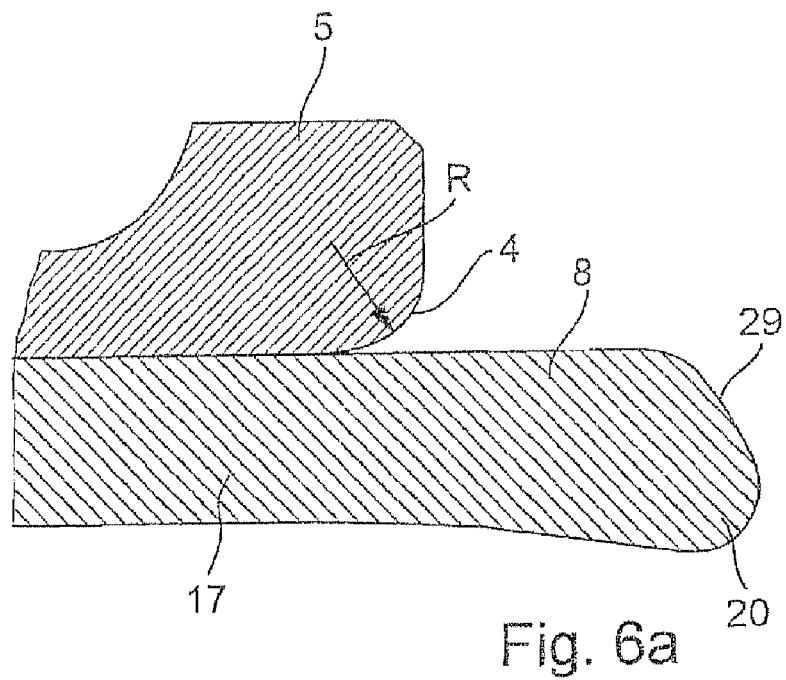
FIG. 6a shows a detail of an end piece and inner ring of the inventive wheel bearing arrangement.
Figure 6B:
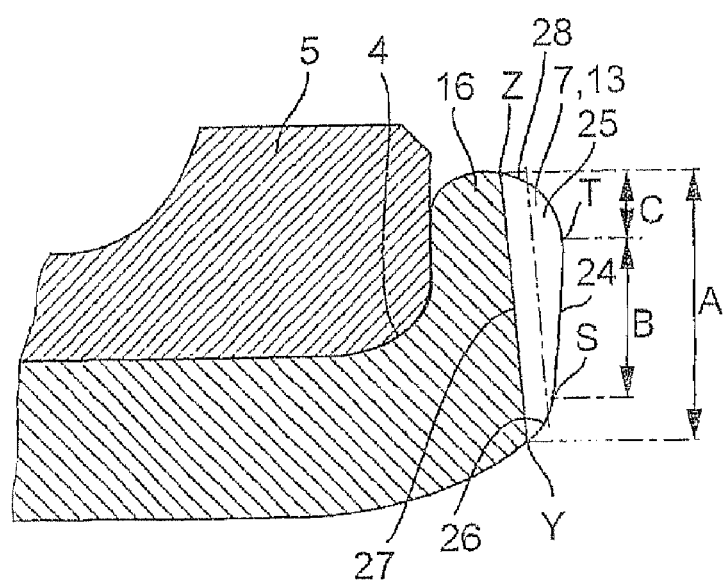
FIG. 6b shows a detail of a collar and inner ring of the inventive wheel bearing arrangement.

The thickened portion 20 illustrated in FIG. 6a protrudes radially in the direction of the rotational axis 1a. The outer contour 29 of the thickened portion 20 drops away toward the end side 21 of the end piece 17 in the direction of the rotational axis 1a. Such a configuration of the invention optimizes the flow and the distribution of the material during the shaping process.

Figure 7A:
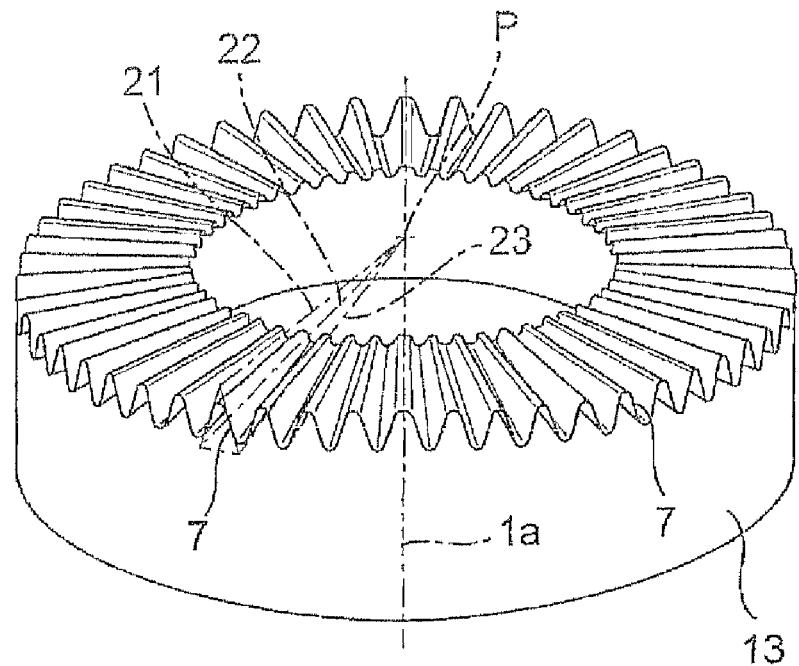
FIG. 7a shows a perspective view of an end toothing configuration.
Figure 7B:
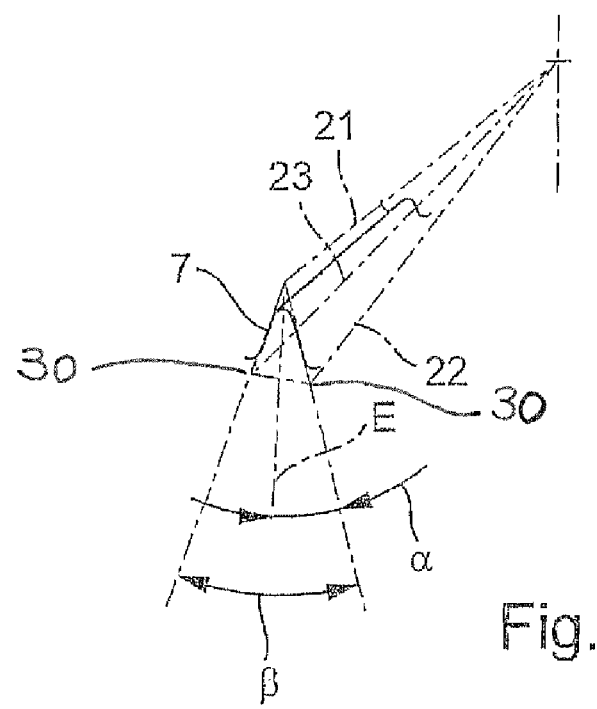
FIG. 7b shows a detail view of a tooth of end toothing configuration.

FIGS. 7a and 7b show the overall view of a possible configuration of the end toothing 13 in a highly simplified form. The teeth 7 are adjacent to one another at the circumference about the rotational axis 1a and oriented radially along the length A. FIGS. 7a and 7b show how the geometry is described without rounding of the individual teeth 7, formed in a wedge shape, at the head, base and edge side by radially oriented geometric lines 21, 22, 23 which meet at the sectional point P. The sectional point P is the common sectional point for all the geometric lines 21, 22, 23 of the crown gear which extend radially. The tooth angle β between the edges 30 is twice the tooth edge angle α and is constant over the entire radial extent of each individual tooth 7.

The contour of the teeth 7 is represented in respective sections, extending through the tooth head 25 along the rotational axis 1a, through the collar 16 as a line segment 24, with the line segment 24 delineating the respective tooth head 25 at the end. The shortest radial distance B between the end points S and T of the line segment 24 is at least of precisely the same size, when viewed in an axial projection B of the line segment 24, as half of the maximum length A of the respective tooth 7 in the radial direction when viewed in an axial projection A. The contour of the respective tooth 7 is initially described by a run-in contour 26 in the longitudinal section. The run-in contour 26 extends radially from the tooth base 27 outward toward the line segment 24 rising progressively over the rotational axis and merges with the line segment 24 at the radially inner end point of the end points S. Radially on the outside, the line segment 24 merges with a run-out contour 28 which extends from the outer end point T to the tooth base 27. The run-out contour 28 runs from the end point T rising degressively over the rotational axis 1a. The run-in contour 26 and the run-out contour 28 each merge at the tooth base side with the hub 1 at a sectional point Y or Z.

The radial distance C between the radially outer end point T and the radially outermost of the sectional points Y of the axial projection C is at maximum as large as a third of the maximum length A of the respective tooth 7 in the radial direction when viewed in an axial projection A, with the length A of the respective tooth 7 being described by the distance A between the sectional points Y and Z.

REFERENCE NUMERALS

1 Hub
1a Rotational axis
2 End piece
3 Collar
4 Edge
5 Inner ring
6 End toothing
7 Tooth
8 Part
9 Wheel bearing arrangement
10 Rolling body
11 Vehicle flange
12 Flange
13 End toothing
14 End piece
15 End piece
16 Collar
17 End piece
18 Thickened portion
19 Thickened portion
20 Thickened portion
21 Geometric line
22 Geometric line
23 Geometric line
24 Line segment
25 Tooth head
26 Run-in contour
27 Tooth base
28 Run-out contour
29 Outer contour
30 Edge
31 Annular gap

The invention claimed is:

1. A collar made from material of a hub which is subjected to cold plastic shaping and with which at least one inner ring of a wheel bearing unit is secured axially in a fixed fashion on the hub, and in which teeth for engagement in a mating soothing are formed at the end, comprising:
    the teeth are adjacent to one another at the circumference around the rotational axis and are aligned radially lengthwise,
    the contour of the teeth is represented in respective sections, extending through the tooth head along the rotational axis, as a line segment, wherein the line segment delineates the respective tooth head at the end,
    the shortest radial distance between the end points of the line segment is at least of precisely the same size, when viewed in an axial projection of the line segment, as half the maximum length of the respective tooth in the radial direction when viewed in an axial projection.

2. The collar as claimed in claim 1, in which the contour in the longitudinal sections:
    is firstly described by a run-in contour, wherein the run-in contour extends radially from the tooth base outward toward the line segment rising over the rotational axis ,
    the run-in contour then merges with the line segment at a radially inner end point of the end points,
    and finally the line segment merges with a run-out contour from a radially outer end point of the end points toward the tooth base, wherein the run-out contour extends from the end point rising over the rotational axis,
    wherein the run-in contour and the run-out contour each end at the tooth base side at a sectional point at which the tooth merges with the hub.

3. The collar as claimed in claim 2, in which the radial distance between the radially outer end point and the radially outermost of the sectional points is at maximum as large, in the axial projection, as a third of the maximum length, considered in axial projection, of the respective tooth in the radial direction, wherein the length of the respective tooth is described by the distance between the sectional points.

4. The collar as claimed in claim 1, in which the teeth are of wedge-shaped design such that the geometric lines of an end toothing meet centrally at a common point on the rotational axis.

5. The collar as claimed in claim 4, in which the edges of the teeth which are provided for engagement in a mating toothing are inclined at an edge angle greater than 20° and less than 30° with respect to a virtual pitch plane starting from the rotational axis.

* * * * *